US009873434B2

(12) United States Patent
Endo et al.

(10) Patent No.: US 9,873,434 B2
(45) Date of Patent: Jan. 23, 2018

(54) VEHICLE CONTROL SYSTEM (71) Applicant: TOYOTA JIDOSHA KABUSHIKI KAISHA, Toyota-shi, Aichi-ken (JP)

(72) Inventors: Takahito Endo, Sunto-gun (JP); Kazumi Hoshiya, Gotemba (JP); Yoshio Ito, Susono (JP); Norimi Asahara, Numazu (JP); Seiji Kuwahara, Susono (JP); Tadashi Fujiyoshi, Susono (JP); Yuji Iwase, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 139 days.

(21) Appl. No.: 15/091,736

(22) Filed: Apr. 6, 2016

(65) Prior Publication Data
US 2016/0297444 A1 Oct. 13, 2016

(30) Foreign Application Priority Data

Apr. 8, 2015 (JP) .................................. 2015-079380

(51) Int. Cl.
| | |
|---|---|
| B60W 30/184 | (2012.01) |
| G05D 1/00 | (2006.01) |
| B60R 17/02 | (2006.01) |
| B60W 30/182 | (2012.01) |
| B60W 10/04 | (2006.01) |
| B60W 10/30 | (2006.01) |
| F16H 61/00 | (2006.01) |

(52) U.S. Cl.
CPC .......... *B60W 30/1843* (2013.01); *B60R 17/02* (2013.01); *B60W 10/04* (2013.01); *B60W 10/30* (2013.01); *B60W 30/182* (2013.01); *F16H 61/00* (2013.01); *G05D 1/0088* (2013.01); *B60W 2550/402* (2013.01); *B60W 2710/30* (2013.01)

(58) Field of Classification Search
CPC .................................................. B60W 30/1843
See application file for complete search history.

(56) References Cited

U.S. PATENT DOCUMENTS 6,253,137 B1  6/2001  Abo et al.

FOREIGN PATENT DOCUMENTS

| JP | 11-189073 A | 7/1999 |
|---|---|---|
| JP | 2000-170888 A | 6/2000 |
| JP | 2006-312353 A | 11/2006 |
| JP | 2007-071265 A | 3/2007 |
| JP | 2007-085397 A | 4/2007 |
| JP | 2008-120271 A | 5/2008 |
| JP | 2012-059274 A | 3/2012 |
| JP | 2012-092892 A | 5/2012 |

*Primary Examiner* — Adam Tissot
*Assistant Examiner* — Michael Berns
(74) *Attorney, Agent, or Firm* — Sughrue Mion, PLLC (57) ABSTRACT A vehicle control system is provided to improve energy efficiency of a vehicle that can be operated not only manually but also autonomously. The vehicle control system is configured to deliver oil to an oil requiring site in a first feeding amount under the manual mode, and to deliver oil to the oil requiring site in a second feeding amount that is smaller than the first feeding amount during propulsion under the autonomous mode in line with a travel plan. When a required amount of oil delivered to the oil requiring site is expected to be increased based on the travel plan under the autonomous mode, the controller increases an oil feeding amount to the oil requiring site from the second feeding amount.

2 Claims, 8 Drawing Sheets

VEHICLE CONTROL SYSTEM

CROSS REFERENCE TO RELATED APPLICATIONS

The present invention claims the benefit of priority to Japanese Patent Application No. 2015-079380 filed on Apr. 8, 2015 with the Japanese Patent Office, the entire contents of which are incorporated herein by reference in its entirety.

BACKGROUND

Field of the Invention

Embodiments of the present invention relates to the art of a vehicle control system configured to switch an operating mode of a vehicle between manual mode and autonomous mode.

Discussion of the Related Art

U.S. Pat. No. 6,253,137 describes an oil pressure supply device for vehicle drive system configured to improve the efficiency of the energy used to drive the oil pump. The hybrid vehicle taught by U.S. Pat. No. 6,253,137 is provided with a V-belt continuously variable transmission for transmitting power of a prime mover to drive wheels, and an electric oil pump for delivering oil to the transmission and to lubrication sites. According to the teachings of U.S. Pat. No. 6,253,137, the microprocessor is programmed to reduce a discharging amount of the oil pump when the transmission is not varying the drive ratio, and to increase a discharging amount of the oil pump when the transmission is varying the drive ratio.

JP-A-2012-59274 describes an automatic drive vehicle that can be operated automatically according to a preset travel plan. According to the teachings of JP-A-2012-59274, specifically, the vehicle is operated automatically by controlling a vehicle speed and steering angle in such a manner to achieve a target pattern of the vehicle speed and a target travel locus.

As described, according to the teachings of U.S. Pat. No. 6,253,137, a discharging amount of the oil pump is increased when the transmission is varying the drive ratio to ensure an oil pressure and an oil delivery amount required to carry out a speed change operation and lubrication. However, the automatic transmission used in automobiles may require a larger amount of oil in situations other than during a speed change operation, for example, when generating a large driving or braking force. For this reason, in the conventional automobiles, the oil is delivered to the oil requiring site in an amount larger than the required amount even under a steady running condition. Consequently, the oil may be applied excessively to the transmission and rotary members and hence energy may be wasted by an agitation loss. In addition, oil pressure may also be raised more than required. In the conventional automobiles, therefore, energy efficiency such as fuel efficiency and electric efficiency may be down.

By contrast, in the automatic drive vehicle taught by JP-A-2012-59274, a required amount of the oil will not be increased by an operation of a driver. For this reason, an agitation loss may be reduced by suppressing an oil delivery amount, and an energy loss resulting from driving a hydraulic source may also be reduced by lowering an oil pressure generated by the hydraulic source. However, such energy loss has not yet been explored sufficiently so far in the prior art. Therefore, energy efficiency of the conventional autonomous drive vehicle has to be improved by reducing a pressure and an amount of the oil delivered to the oil requiring site.

SUMMARY

Aspects of the present application have been conceived noting the foregoing technical problems, and it is therefore an object of the present application is to provide a vehicle control system configured to improve energy efficiency of a self-driving vehicle in which an operating mode can be selected from an autonomous mode and a manual mode by optimizing an oil delivery amount to oil requiring sites.

The present invention relates to a vehicle control system that is applied to a vehicle having an oil feeding device for delivering oil to an oil requiring site, and an operating mode of the vehicle can be selected from a manual mode in which the vehicle is operated manually by a driver and an autonomous mode in which the vehicle is operated autonomously in line with a travel plan including an expected required driving force. In order to achieve the above-explained objective, according to the preferred embodiment, a controller of the vehicle control system is configured: to create the travel plan; to control a driving force and the oil feeding device in line with the travel plan; to deliver oil from the oil feeding device to the oil requiring site in a first feeding amount during propulsion under the manual mode, and to deliver oil from the oil feeding device to the oil requiring site in a second feeding amount that is smaller than the first feeding amount during propulsion under the autonomous mode; and to increase an oil feeding amount to the oil requiring site from the second feeding amount when a required amount of oil delivered to the oil requiring site is expected to be increased based on the travel plan during propulsion under the autonomous mode.

In a non-limiting embodiment, the controller may be further configured to: reduce the oil feeding amount to the oil requiring site to the second feeding amount after a completion of shifting of the operating mode from the manual mode to the autonomous mode; and to increase the oil feeding amount to the oil requiring site to the first feeding amount before a completion of shifting of the operating mode from the autonomous mode to the manual mode.

During propulsion under the manual mode, a requisite oil amount to the oil requiring site may be increased by a manual operation of the driver; and hence oil is delivered to the oil requiring site in the first feeding amount that is larger than the requisite amount. By contrast, under the autonomous mode, the requisite oil amount to the oil requiring site will not be increased by a manual operation. According to the preferred embodiment, therefore, the vehicle control system controls the oil feeding device in such a manner that the oil feeding amount to the oil requiring site is reduced under the autonomous mode to the second feeding amount that is smaller than the first feeding amount to be selected under the manual mode. For this reason, an oil agitation loss as well as an energy loss resulting from driving a hydraulic source of the oil deeding device can be reduced.

According to the preferred embodiment, an expected amount of oil required by the oil requiring site during propulsion under the autonomous mode can be estimated based on the travel plan so that the oil feeding amount to the oil requiring site is increased if the requisite oil amount to the oil requiring site is expected to be increased during propulsion under the autonomous mode. According to the preferred embodiment, therefore, oil can be delivered properly to the oil requiring site without excess and deficiency during propulsion under the autonomous mode.

Thus, according to the preferred embodiment, energy efficiency can be improved by reducing the oil feeding amount to the oil requiring site during propulsion under the autonomous mode, and the oil feeding amount to the oil requiring site can be optimized in accordance with an expected change in the required amount. According to the preferred embodiment, therefore, seizure and overheating of members of the oil requiring site can be prevented. In addition, an automatic transmission is allowed to be operated properly by controlling the oil feeding amount thereto depending on situation.

Specifically, the oil feeding amount to the oil requiring site is reduced to the second feeding amount after a completion of the shifting of the operating mode from the manual mode to the autonomous mode. According to the preferred embodiment, therefore, oil can be delivered sufficiently to the oil requiring site even if the requisite amount is increased by an operation of the driver during the transitional state. By contrast, the oil feeding amount to the oil requiring site is increased before a completion of the shifting of the operating mode from the autonomous mode to the manual mode. In this case, therefore, oil can be delivered sufficiently to the oil requiring site even if the requisite amount is increased by an operation of the driver as soon as the establishment of the manual mode.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
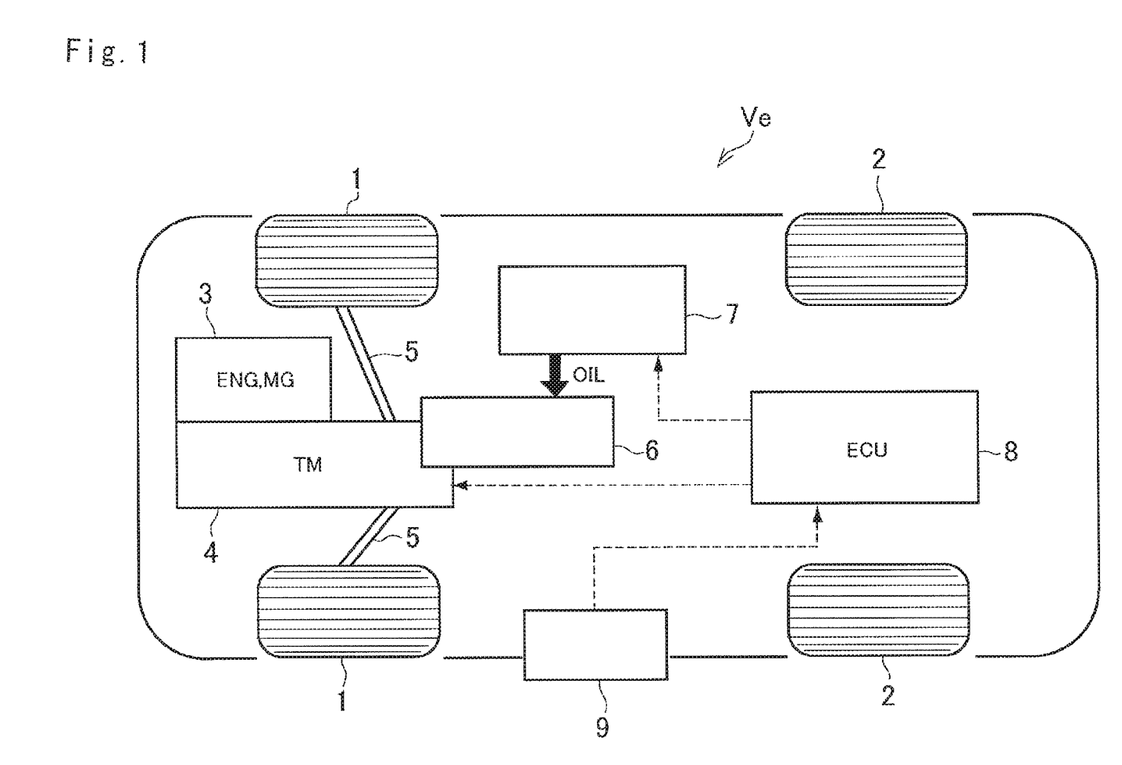
FIG. 1 is a schematic illustration showing the control system of the self-driving vehicle to which the control system according to the preferred embodiment is applied.

Preferred embodiments of the present application will now be explained with reference to the accompanying drawings. Referring now to FIG. 1, there is shown an example of a self-driving vehicle Ve to which the control system according to the preferred embodiment is applied. An operating mode of the vehicle Ve may be shifted between manual mode in which the vehicle Ve is operated manually by a driver and autonomous mode in which the vehicle Ve is operated autonomously. In the autonomous mode, the vehicle Ve is operated autonomously in line with a travel plan.

The vehicle Ve shown in FIG. 1 is a front-wheel-drive vehicle comprising a pair of front wheels 1 and a pair of rear wheels 2. In the vehicle Ve, power of a prime mover 3 such as an engine and a motor-generator (referred to as "ENG" and "MG" in FIG. 1) is delivered to the front wheels 1 through a transmission (referred to as "TM" in FIG. 1) 4 and a driveshaft 5 to propel the vehicle Ve. Here, it is to be noted that the control system may also be applied to a rear-wheel-drive vehicle in which power of the prime mover 3 is delivered to the rear wheels 2, and to a four-wheel-drive vehicle in which power of the prime mover 3 is delivered to both front wheels 1 and rear wheels 2. Each of the front wheel 1 and the rear wheel 2 are provided individually with a brake device.

For example, if an engine is used as the prime mover 3 to propel the vehicle Ve, the engine is started and stopped electrically, and output power thereof is also adjusted electrically. Specifically, given that a gasoline engine is used as the prime mover 3, an opening degree of a throttle valve, an amount of fuel supply, a commencement and a termination of ignition, an ignition timing etc. are controlled electrically. A permanent magnet type synchronous motor having a generating function, that is, a motor-generator may also be used as the prime mover 3. In this case, the prime mover 3 is connected with a battery (not shown) through an inverter (not shown) to control a rotational speed and a torque thereof so that the prime mover 3 can be operated selectively as a motor and a generator responsive to a current applied thereto.

As to the transmission 4, for example, a conventional geared automatic transmission, a belt-driven continuously variable transmission, a toroidal continuously variable transmission etc. may be used as the transmission 4. Given that the vehicle Ve is a hybrid vehicle, the transmission 4 includes a power distribution device for distributing and synthesizing powers of the engine and the motor(s).

In order to supply oil to an oil requiring site 6 of the transmission 4, the vehicle Ve is provided with an oil feeding device 7. Specifically, the oil requiring site 6 is a member necessary to be cooled and lubricated by the oil. For example, the oil requiring site 6 includes: rotary members such as a gear and a rotary shaft; a multiple-plate clutch, a hydraulic control device and a hydraulic actuator of the automatic transmission; a pulley and a driving belt of the continuously variable transmission; a coil end of the motor and so on.

Figure 6:
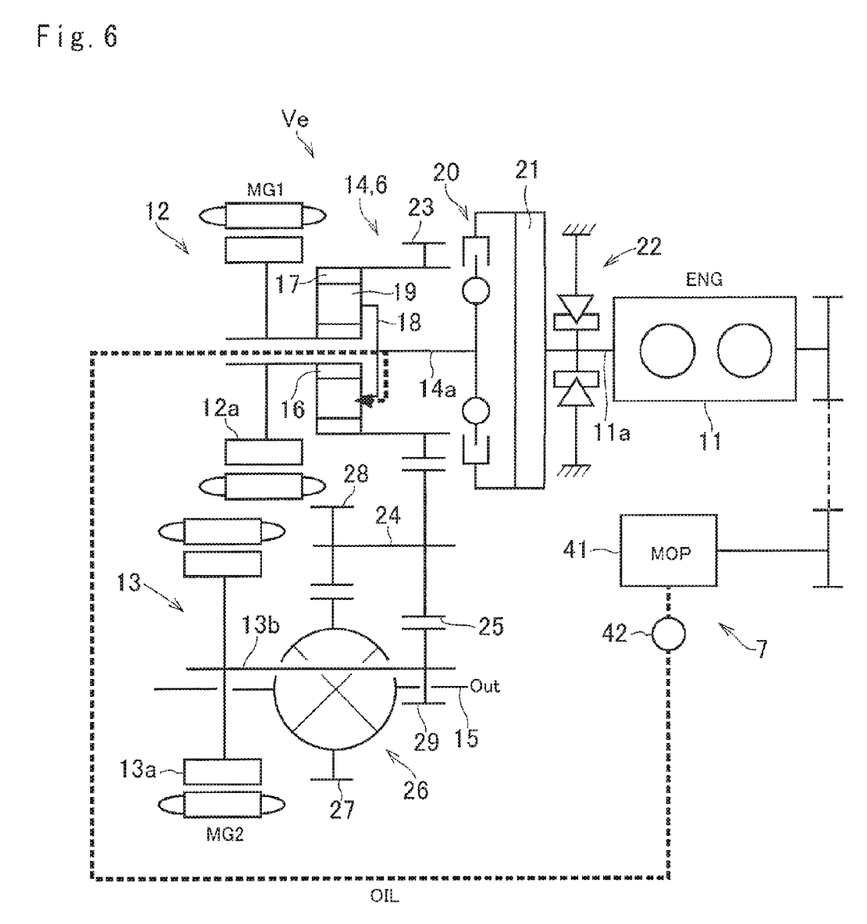
FIG. 6 is a schematic illustration showing a second example of the oil feeding device of the vehicle to which the control system is applied.
Figure 7:
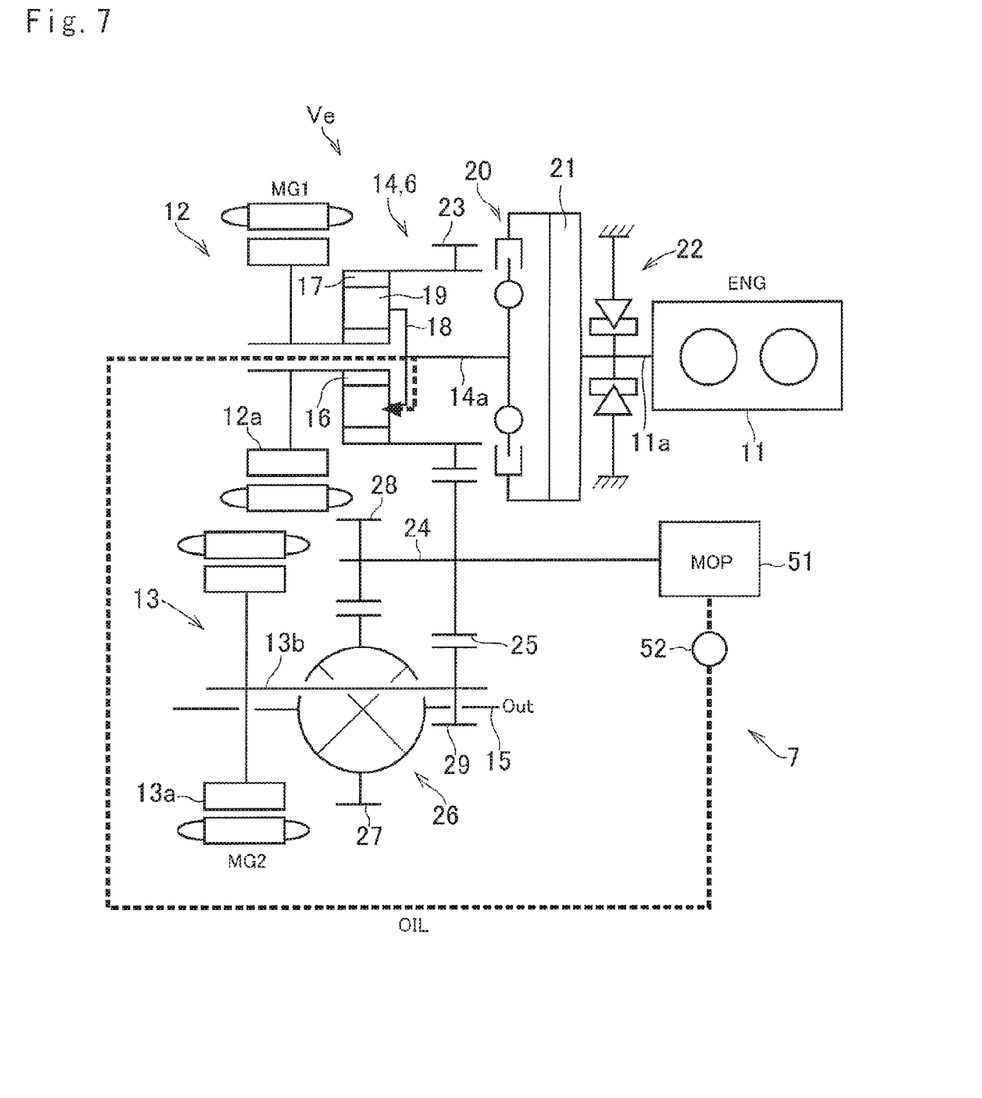
FIG. 7 is a schematic illustration showing a third example of the oil feeding device of the vehicle to which the control system is applied.
Figure 8:
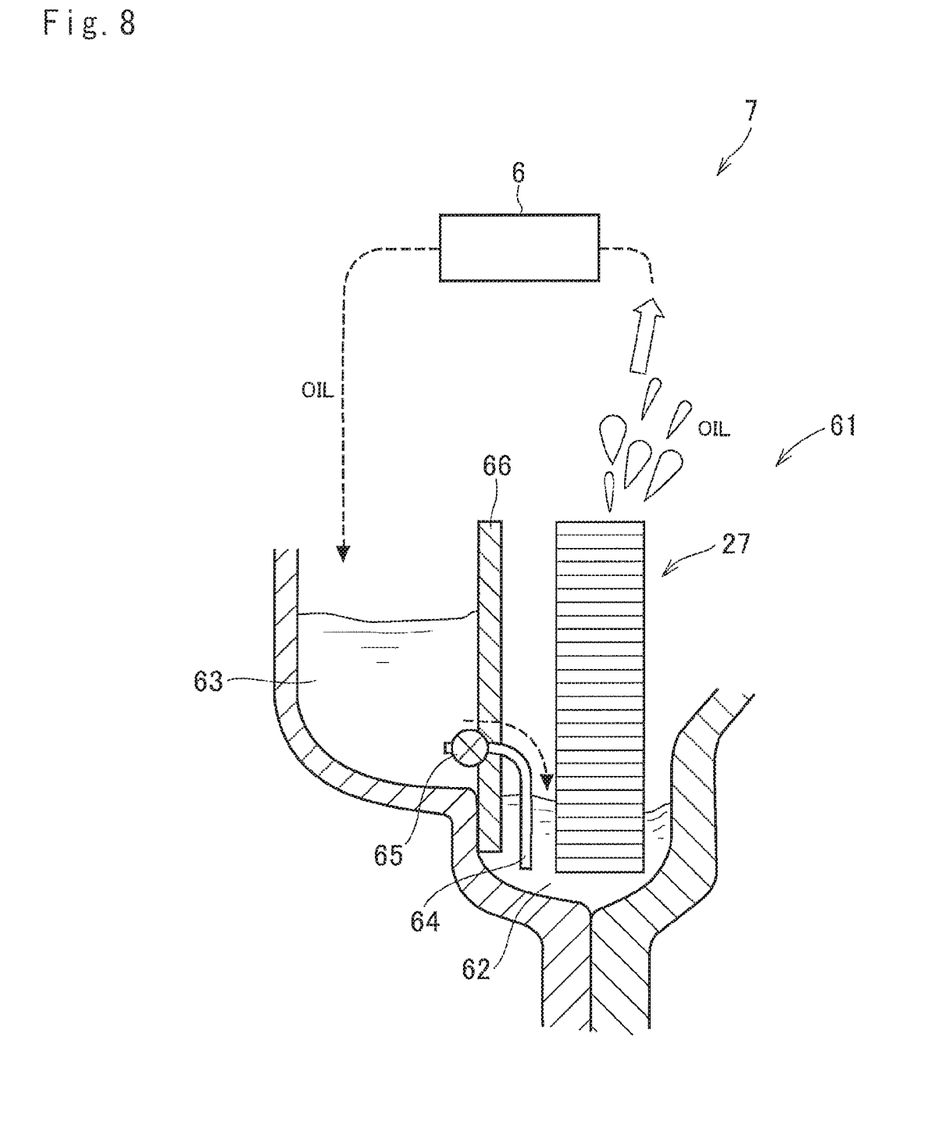
FIG. 8 is a schematic illustration showing a fourth example of the oil feeding device of the vehicle to which the control system is applied.

The oil feeding device 7 is adapted to control oil delivery to the oil requiring site 6. To this end, for example, the oil feeding device 7 is provided with an electric oil pump (to be abbreviated as the "EOP" hereinafter) 30 shown in FIG. 2 that is driven by a pump motor 22 connected thereto. As described later, mechanical oil pump (to be abbreviated as the "MOP" hereinafter) 41 shown in FIG. 6 provided with an electromagnetic valve 42, an MOP 51 shown in FIG. 7 provided with an electromagnetic valve 52, and a splash lubrication device 61 shown in FIG. 8 provided with an electromagnetic valve 65 may also serve as the oil feeding device 7.

In order to integrally control the prime mover 3, the transmission 4, the oil feeding device 7, the brake device, a steering device etc., the vehicle Ve is further provided with a controller (referred to as "ECU" in FIG. 1) 8 as an electronic control unit composed mainly of a microcomputer. Specifically, detection signals and information from sensors 9 including on-board units are sent to the controller 8. Although only one controller is depicted in FIG. 1, a plurality of controllers 8 may be arranged in the vehicle Ve to control the above-listed devices individually.

Specifically, the sensor 10 includes an accelerator sensor for detecting an opening degree of an accelerator, a brake sensor (or switch) for detecting a depression of a brake pedal, a steering sensor for detecting a steering angle of the steering device, an engine speed sensor for detecting a speed of the engine, an output speed sensor for detecting a speed of an output shaft of the transmission 4, a vehicle speed sensor for detecting rotational speeds of the front wheels 1 and the rear wheels 2, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, an oil temperature sensor for detecting a temperature of the oil delivered to the oil requiring site 6 and so on.

In addition, the sensor 9 further includes at least one of the following external sensors for detecting an external condition, such as an on-board camera, a RADAR (i.e., a radio detection and ranging) a LIDAR (i.e., a laser imaging detection and ranging).

Specifically, the on-board camera is arranged inside of a windshield glass, and transmits recorded information about the external condition to the controller 8. To this end, not only a monocular camera but also a stereo camera having a plurality of lenses and image sensors to achieve a binocular vision may be used as the on-board camera. If the stereo camera is used as the on-board camera, the controller 8 is allowed to obtain three-dimensional information in the forward direction.

The RADAR is adapted to detect obstacles utilizing radio waves such as millimetric-waves and microwaves, and to transmit detected information to the controller 9. Specifically, the RADAR detects an obstacle such as other vehicle and so on by emitting radio waves and analyzing the radio waves reflected from the obstacle.

Likewise, the LIDAR is adapted to detect obstacles utilizing laser light and to transmit detected information to the controller 8. Specifically, the LIDAR detects an obstacle such as other vehicle and so on by emitting laser light and analyzing the laser light reflected from the obstacle.

In addition, the vehicle Ve is further provided with a GPS (i.e., global positioning system) receiver, a digital map database, and a navigation system. Specifically, the GPS receiver is adapted to obtain a position (i.e., latitude and longitude) based on incident signals from GPS satellites, and to transmit the positional information to the controller 9. The digital map database may be installed in the controller 9, but map information stored in external online information processing systems may also be available. The navigation system is configured to determine a travelling route of the vehicle Ve based on the positional information obtained by the GPS receiver and the map database.

The controller 8 carries out calculations based on the incident data or information from the sensor 10 and preinstalled data, and calculation results are sent in the form of command signal to the prime mover 3, the transmission 4 and the oil feeding device 7, and to the actuators of the brake device, the steering device and so on.

In order to operate the vehicle Ve autonomously, the vehicle Ve is provided with a throttle actuator, a brake actuator, a steering actuator and so on. Specifically, the throttle actuator is adapted to change an opening degree of the throttle valve or an electric power supplied to the motor in response to reception of the command signal. The brake actuator is adapted to actuate the brake device to control braking force applied to the wheels 2 and 3 in response to reception of the command signal. The steering actuator is adapted to activate the assist motor of the steering device to control a steering torque in response to reception of the command signal.

The controller 8 comprises a position recognizer, an external condition recognizer, a running condition recognizer, a travel plan creator, and a travel controller.

Specifically, the position recognizer is configured to recognize a current position of the vehicle Ve on the map based on the positional information received by the GPS receiver and the map database. The current position of the vehicle Ve may also be obtained from the positional information used in the navigation system. Optionally, the vehicle Ve may also be adapted to communicate with external sensors arranged along the road to obtain the current position of the vehicle Ve.

The external condition recognizer is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer is configured to recognize running condition of the vehicle Ve such as a vehicle speed, a longitudinal acceleration, a lateral acceleration, a yaw rate and so on based on detection result of the internal sensors.

The travel plan creator is configured to create a travel locus of the vehicle Ve based on a target course determined by the navigation system, a position of the vehicle Ve recognized by the position recognizer, and an external condition recognized by the external condition recognizer. That is, the travel plan creator creates a travel locus of the vehicle Ve within the target course in such a manner that the vehicle Ve is allowed to travel safely and properly while complying traffic rules.

In addition, the travel plan creator is further configured to create a travel plan in line with the created travel locus. The travel plan creator creates a travel plan in line with the target course based on the recognized external conditions and the map database.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator creates a future plan to change a vehicle speed, acceleration, steering torque etc. during travelling along the target course in the form of e.g., a map.

Alternatively, the travel plan creator may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller is configured to operate the vehicle Ve autonomously in line with the travel plan created by the travel plan creator. To this end, specifically, the travel controller transmits command signals to the throttle actuator, the brake actuator; the steering actuator; the shifting actuator and so on in accordance with the travel plan.

Figure 2:
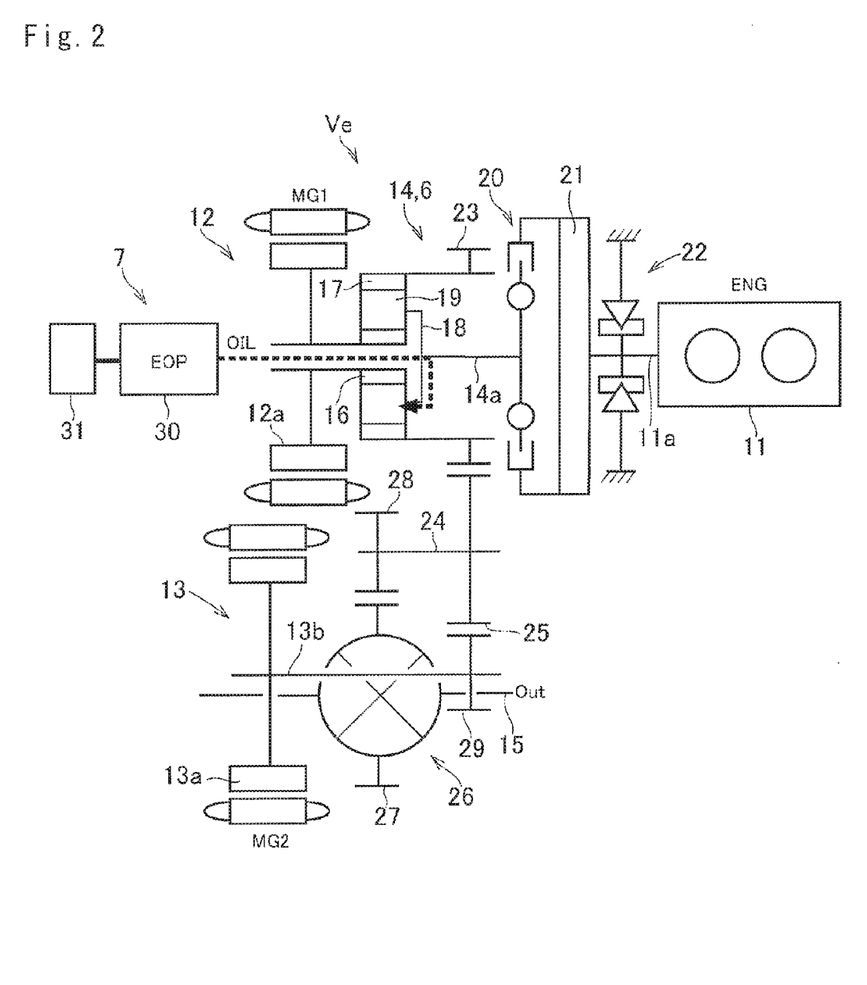
FIG. 2 is a schematic illustration showing a first example of the powertrain and the oil feeding device of the vehicle to which the control system is applied.

Turning to FIG. 2, there is shown one example of a powertrain of the self-driving vehicle Ve. According to the preferred embodiment, the control system is applied to the vehicle Ve as a hybrid vehicle in which a prime mover includes an engine 11 (referred to as "ENG" in FIG. 2), a first motor 12 (referred to as "MG1" in FIG. 2), and a second motor 13 (referred to as "MG2" in FIG. 2).

In the vehicle Ve shown in FIG. 2, a power of the engine 11 is distributed to the first motor 12 side and to a driveshaft 15 side through a power distribution device 14. Meanwhile, an electric power generated by the first motor 12 is supplied to the second motor 13 so that the second motor 3 is driven to generate a power for assisting driving force to rotate the driveshaft 15.

For example, a single-pinion planetary gear unit having a sun gear 16, a ring gear 17 and a carrier 18 may be used as the power distribution device 14, and the power distribution device 14 is arranged coaxially with an output shaft 11a of the engine 11.

The first motor 12 is situated on an opposite side of the engine 11 across the power distribution device 14. The sun gear 16 of the power distribution device 14 is connected to a rotor shaft 12a of the first motor 2, and the ring gear 17 as an internal gear is situated concentrically with the sun gear 16. A plurality of pinion gears 19 are interposed between the sun gear 16 and the ring gear 17 while meshing with those gears, and the pinion gears 19 are supported by the carrier 18 connected to an input shaft 14a of the power distribution device 14 in a rotatable and revolvable manner. The input shaft 14a is also connected to the output shaft 11a of the engine 11 through a one-way clutch 22.

The one-way clutch 22 comprises a rotary member connected to the output shaft 11a of the engine 11 and to the carrier 18 through a damper device 20 and a flywheel 21, and a stationary member fixed to a housing. In the one-way clutch 22, the rotary member is allowed to rotate freely in a rotational direction of the engine 11, but the rotary member is brought into engagement with the stationary member when rotated in the opposite direction to halt a counter rotation of the output shaft 11a and the carrier 18. That is, the one-way clutch 22 serves as a brake device to halt rotation of the output shaft 11a of the engine 11 when propelling the vehicle Ve by output torques of the first motor 2 and the second motor 3. To this end, a friction brake or the like may also be used instead of the one-way clutch 10.

A drive gear 23 is an external gear that is formed around the ring gear 17 of the power distribution device 14 integrally therewith, and a countershaft 24 is arranged in parallel with a common rotational axis of the power distribution device 14 and the first motor 12. A counter driven gear 25 is fitted onto one of the end portions of the countershaft 24 (i.e., right side in FIG. 2) in such a manner to be rotated therewith while being meshed with the drive gear 23. A counter drive gear 28 is fitted onto the other end portion of the countershaft 24 (i.e., left side in FIG. 2) in such a manner to be rotated therewith while being meshed with a ring gear 27 of a differential gear unit 26 as a final reduction. Thus, the ring gear 17 of the power distribution device 14 is connected to the driveshaft 15 through the drive gear 23, the countershaft 24, the counter driven gear 25, the counter drive gear 18, and the deferential gear unit 26.

Torque of the second motor 13 can be added to torque transmitted from the power distribution device 14 to the driveshaft 15. To this end, the second motor 13 is arranged in parallel with the countershaft 24, and a reduction gear 29 connected to a rotor shaft 13b rotated integrally with a rotor 13a is meshed with the counter driven gear 25. That is, the ring gear 17 of the power distribution device 14 is connected to the driveshaft 15 and the second motor 13 through the aforementioned gear train or the reduction gear 29.

Thus, in the vehicle Ve, the output shaft 11a of the engine 11 and the rotor shaft 12b of the first motor 12 are connected to the gear train of the driveshaft 15 side and the deferential gear unit 26 through the power distribution device 14. That is, the output torques of the engine 11 and the first motor 12 are delivered to the driveshaft 15 through the power distribution device 14.

In order to cool and lubricate the oil requiring site 6 including the power distribution device 14, the vehicle Ve is further provided with a mechanical oil pump (not shown) driven by torque of the engine 11. Specifically, a rotor (not shown) of the mechanical oil pump is rotated by a rotation of the output shaft 11a of the engine 11 to establish hydraulic pressure during operation of the engine 11. The oil discharged from the mechanical oil pump is delivered to the oil requiring site 6 through a predetermined oil passage (not shown).

In addition, the oil splashed by the ring gear 27 of the differential gear unit 26 as a part of a splash lubrication device (not shown) also applied to the oil requiring site 6 such as the power distribution device 14. Specifically, in the splash lubrication device, teeth of the ring gear 27 is immersed in the oil in an oil pan (not shown) so that the oil is splashed by the ring gear 27 rotated by a torque of the driveshaft 15 to be applied to the power distribution device 14. That is the oil can be applied to the oil requiring site 6 as long as the driveshaft 15 is rotated during propulsion of the vehicle Ve even if the output shaft 11a of the engine 11 is not rotated.

As described, the above-mentioned mechanical oil pump cannot establish hydraulic pressure during cessation of engine operation, but the oil still can be applied to the oil requiring site 6 from the splash lubrication device if the vehicle Ve is running. However, lubricating or cooling performance of the splash lubrication device adapted to deliver oil to the oil requiring site 6 utilizing gravitational force is not comparable to that of a forced lubrication device adapted to discharge pressurized oil. In addition, the lubricating or cooling performance of the splash lubrication device may be affected by a temperature and a vehicle speed. For example, if an oil temperature is low, viscosity of the oil is increased and hence the oil may not be delivered sufficiently to the oil requiring site 6 by the splash lubrication device. Likewise, if the vehicle speed is low the ring gear 27 is rotated at a low speed and hence the oil may not be delivered sufficiently to the oil requiring site 6. By contrast, if the oil temperature is high and oil viscosity is low, and if a rotational speed of the pinion gear 19 is high, the oil may also be splashed by the pinion gears 19 without adhering thereto and hence the power distribution device 14 may not be lubricated sufficiently.

In order to ensure oil delivery to the oil requiring site 6 even when the engine 11 is stopping or even when the splash lubrication device is not in condition to achieve the required performance, the vehicle Ve is provided with the above-mentioned EOP 30 driven by a torque of a pump motor 31 connected thereto.

To this end, the pump motor 31 is arranged in the vehicle Ve to establish hydraulic pressure by the EOP 30, in addition to the first motor 12 and the second motor 13.

The oil discharged from the EOP 30 is also delivered through the oil passage (not shown) to the oil requiring site 6 such as the pinion gears 9, pinion shafts 9a, bearings and so on of the power distribution device 14.

The engine 11, the first motor 12, the second motor 13, the pump motor 31 and etc. are controlled by the controller 8, and a running mode of the hybrid vehicle Ve is selected in an optimally fuel or energy efficient manner. Specifically, the running mode of the vehicle Ve is selected from mode where the vehicle Ve is powered at least by the engine 11, and EV mode where the vehicle Ve is powered by at least one of the motors 2 and 3 while stopping the engine 1 depending on a running condition.

The EV mode can be selected depending on a running condition from single-motor mode as the first EV mode where the vehicle Ve is powered only by the second motor 13, and dual-motor mode as the second EV mode where the vehicle Ve is powered by both of the first motor 12 and the second motor 13.

Under the single-motor mode, the second motor 13 is operated as a motor to generate torque by rotating in a forward direction (i.e., a rotational direction of the output shaft 1a of the engine 1) so that the vehicle Ve is propelled by the second motor 13.

Under the dual-motor mode, the vehicle Ve is powered by both of the first motor 12 and the second motor 13. In this case, the first motor 12 is rotated in a counter direction (opposite to the rotational direction of the output shaft 11a of the engine 11) to generate torque, while the second motor 13 is rotated in the forward direction (i.e., in the rotational direction of the output shaft 1a of the engine 1) to generate torque. In this situation, torque in the counter direction is applied to the output shaft 11a of the engine 11 so that the one-way clutch 22 is brought into engagement. Consequently, the vehicle Ve is allowed to be propelled efficiently by the motors 2 and 3 while stopping rotations of the output shaft 11a of the engine 11 and the carrier 18 of the power distribution device 14.

Thus, the running mode of the vehicle Ve is switched between the HV mode and the EV mode depending on a running condition and a demanded driving force. As stated above, under the EV mode, the engine 11 is stopped and hence the mechanical oil pump connected to the engine 11 is not allowed to generate hydraulic pressure. However, under the single-motor mode, the oil is required to lubricate and cool the second motor 13. In addition, under the dual-motor mode, the oil is required to lubricate and cool the pinion gears 19 and the pinion shafts 9a of the power distribution device 14. Under the dual-motor mode, specifically, the first motor 12 and the second motor 13 are rotated in opposite directions while bringing the one-way clutch 22 into engagement to halt rotations of the carrier 18 and the output shaft 11a. That is, in the power distribution device 14, the sun gear 16 and the ring gear 17 are rotated in opposite directions while halting rotation of the carrier 18, and the pinion gears 19 are rotated while being inhibited to revolve around the sun gear 16. In this situation, a rotational speed of each pinion gear 19 is governed by a speed difference between the sun gear 16 and the ring gear 17. However, since the sun gear 16 and the ring gear 17 are thus rotated in the opposite directions, the pinion gears 19 are rotated at a high speed. For this reason, under the dual-motor mode, it is necessary to deliver the oil sufficiently to the power distribution device 14 to prevent seizure and to reduce frictions of the pinion gears 19 and the pinion shafts 19a.

In the vehicle Ve, therefore, the EOP 30 is driven by activating the pump motor 32 to deliver the oil to the power distribution device 14 when the EV mode is selected or when the engine 11 is stopped.

Thus, in the vehicle Ve shown in FIG. 2, the oil can be delivered to the oil requiring site 6 such as the pinion gears 9 of the power distribution device 14, the coil ends of the first motor 12 and the second motor 13 and so on from the oil feeding device 7 having the EOP 30 as a hydraulic source. In addition, the operating mode of the vehicle Ve can be selected from the manual mode in which the vehicle Ve is operate manually by the driver and the autonomous mode in which the vehicle Ve is operated autonomously in line with the travel plan. In the vehicle Ve, therefore, change in an amount of oil required to be delivered to the oil requiring site 6 during propulsion under the autonomous mode can be projected based on the travel plan, and the oil feeding device 7 delivers oil to the oil requiring site 6 in the requisite amount.

Figure 3:
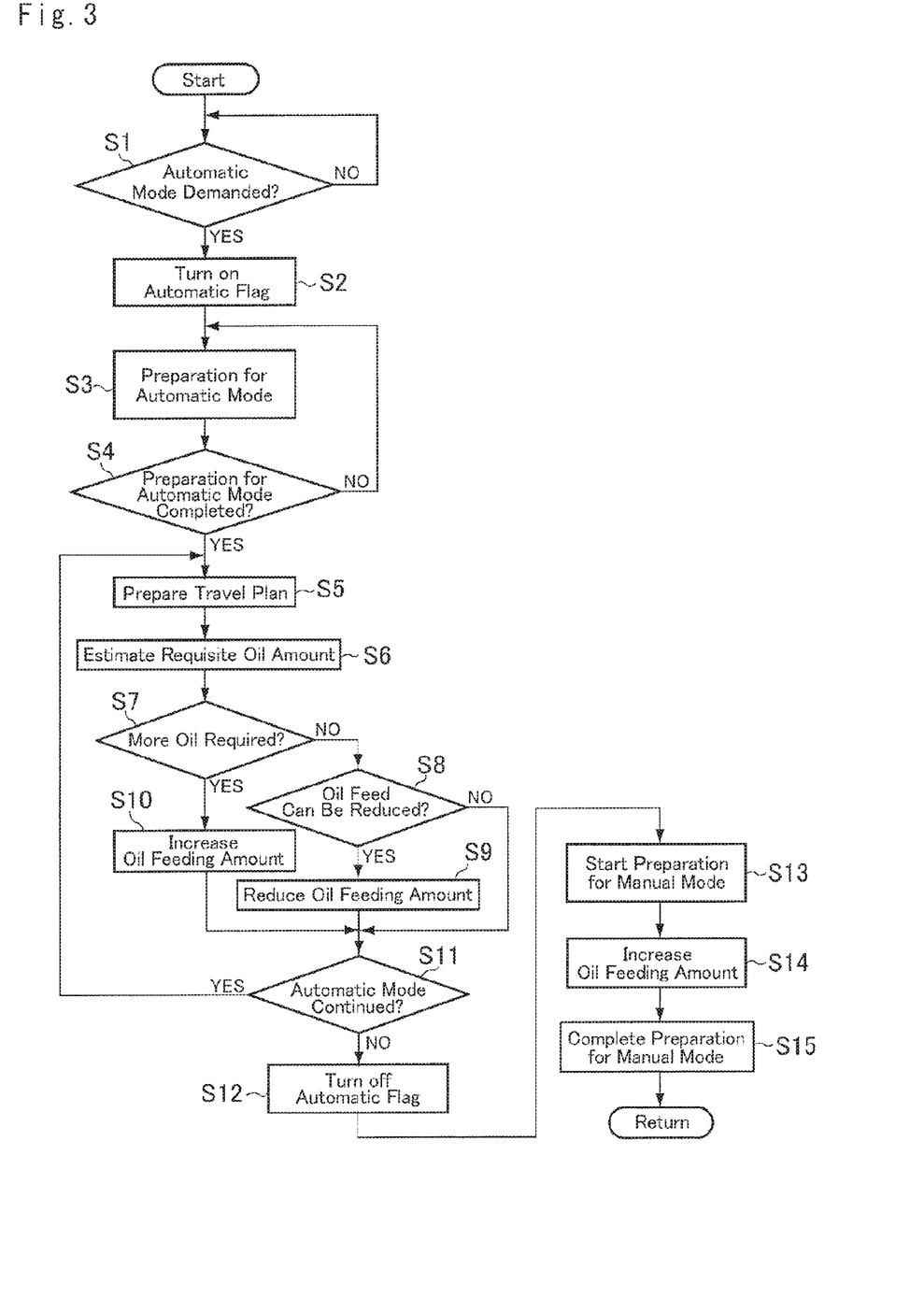
FIG. 3 is a flowchart showing a control example carried out by the control system.

Turning to FIG. 3, there is shown a control example of the oil feeding device 7 to be executed during a transitional state from the manual mode and the autonomous mode. First of all, a shifting demand to the autonomous mode is determined at step S1. For example, such demand for the autonomous mode can be determined based on a switch operation of the driver, or based on an entrance of the vehicle Ve into an autonomous operation region set in the travel plan. The determination of step S1 is repeated until the autonomous mode is demanded.

If the autonomous mode is demanded, a flag to establish the autonomous mode is turned on at step S2, and a preparation for the autonomous mode is carried out at step S3. Specifically, the flag to establish the autonomous mode is turned on if the operating mode is shifted from the manual mode to the autonomous mode, and turned off if the operating mode is shifted from the autonomous mode to the manual mode.

Then, a completion of the preparation for the autonomous mode is determined at step S4. If the preparation for the autonomous mode has not yet been completed so that the answer of step S4 is NO, the determination of step S4 is repeated until the preparation is completed.

By contrast, if the preparation for the autonomous mode has already been completed so that the answer of step S4 is YES, the routine advances to step S5 to prepare a travel plan under the autonomous mode. Specifically, the above-explained travel plan creator of the controller 8 creates the travel plan based on the prospective data after few seconds to several ten seconds from the present moment.

Then, an expected amount of oil required by the oil requiring site 6 during propulsion under the autonomous mode is estimated at step S6 based on the travel plan prepared at step S5.

Thereafter, the estimated oil amount required by the oil requiring site 6 is compared to a current oil feeding amount to the oil requiring site 6 at step S7 so as to determine necessity to increase the oil feeding amount to the oil requiring site 6. If the current oil feeding amount to the oil requiring site 6 is larger than the estimated oil amount required by the oil requiring site 6 so that the answer of step S7 is NO, the oil feeding amount to the oil requiring site 6 will not be increased.

In this case, the routine advances to step S8 to determine whether or not the oil feeding amount to the oil requiring site 6 can be reduced.

During propulsion under the manual mode, a requisite amount of oil delivered to the oil requiring site 6 may be increased by a manual operation of the driver. Under the manual mode, therefore, oil is delivered to the oil requiring site 6 from the oil feeding device 7 in a first feeding amount q1 that is larger than the requisite amount. By contrast, during propulsion under the autonomous mode, the requisite amount of oil delivered, to the oil requiring site 6 will not be increased by a manual operation and hence the oil feeding amount to the oil requiring site 6 can be reduced. Specifically, under the autonomous mode, oil is delivered to the oil requiring site 6 from the oil feeding device 7 in a second feeding amount q2 that is smaller than the first feeding amount q1 as long as the requisite amount of oil delivered to the oil requiring site 6 is not increased.

If the requisite amount of oil delivered to the oil requiring site 6 based on the travel plan is not expected to be increased and hence the oil feeding amount to the oil requiring site 6 can be reduced, that is, if the answer of step S8 is YES, the routine advances to step S9 to reduce the oil feeding amount to the oil requiring site 6 to the second feeding amount q2.

Thus, after the completion of preparation for shifting the operating mode of the vehicle Ve to the autonomous mode, the oil feeding amount to the oil requiring site 6 is reduced at step S9.

By contrast, if the current oil feeding amount to the oil requiring site 6 is smaller than the estimated oil amount required by the oil requiring site 6 so that the answer of step S7 is YES, the routine advances to step S10 to increase the oil feeding amount to the oil requiring site 6. In this case, specifically, oil is delivered to the oil requiring site 6 from the oil feeding device 7 in a third feeding amount q3 that is larger than the second feeding amount q2. For example, the third feeding amount q3 may be set to a same amount as the first feeding amount q1. Alternatively, the third feeding amount q3 may also be varied depending on the estimated requisite amount to the oil requiring site 6.

After reducing the oil feeding amount to the oil requiring site 6 to the second feeding amount q2 at step S9 or after increasing the oil feeding amount to the oil requiring site 6 to third feeding amount q3 at step S10, the routine advances to step S11 to determine whether or not to continue the autonomous mode. Likewise, if the requisite oil amount to the oil requiring site 6 based on the travel plan is expected to be increased and hence the oil feeding amount to the oil requiring site 6 cannot be reduced, that is, if the answer of step S8 is NO, the routine advances to step S11 while skipping step S9.

During propulsion under the autonomous mode, a shifting demand to the manual mode may also be determined based on a switch operation of the driver, or based on an exit from the autonomous operation region set in the travel plan.

If the autonomous mode is still demanded so that the answer of step S11 is YES, the routine returns to step S5 to repeat the foregoing controls until the operating mode to the manual mode is demanded.

By contrast, if the manual mode is demanded so that the answer of step S11 is NO, the routine advances to step S12 to turn off the flag to establish the autonomous mode.

Then, a preparation for the manual mode is started at step S13. In this situation, the oil feeding amount to the oil requiring site 6 is increased prior to a completion of the preparation for shifting the operating mode to the manual mode.

Specifically, at step S14, the oil feeding amount to the oil requiring site 6 is increased from the second feeding amount q2 to the first feeding amount q1 prior to a completion of the preparation for shifting the operating mode to the manual mode.

Thereafter, the preparation for shifting the operating mode to the manual mode is completer at step S15, and the operating mode is shifted to the manual mode. Then, the routine is returned.

Figure 4:
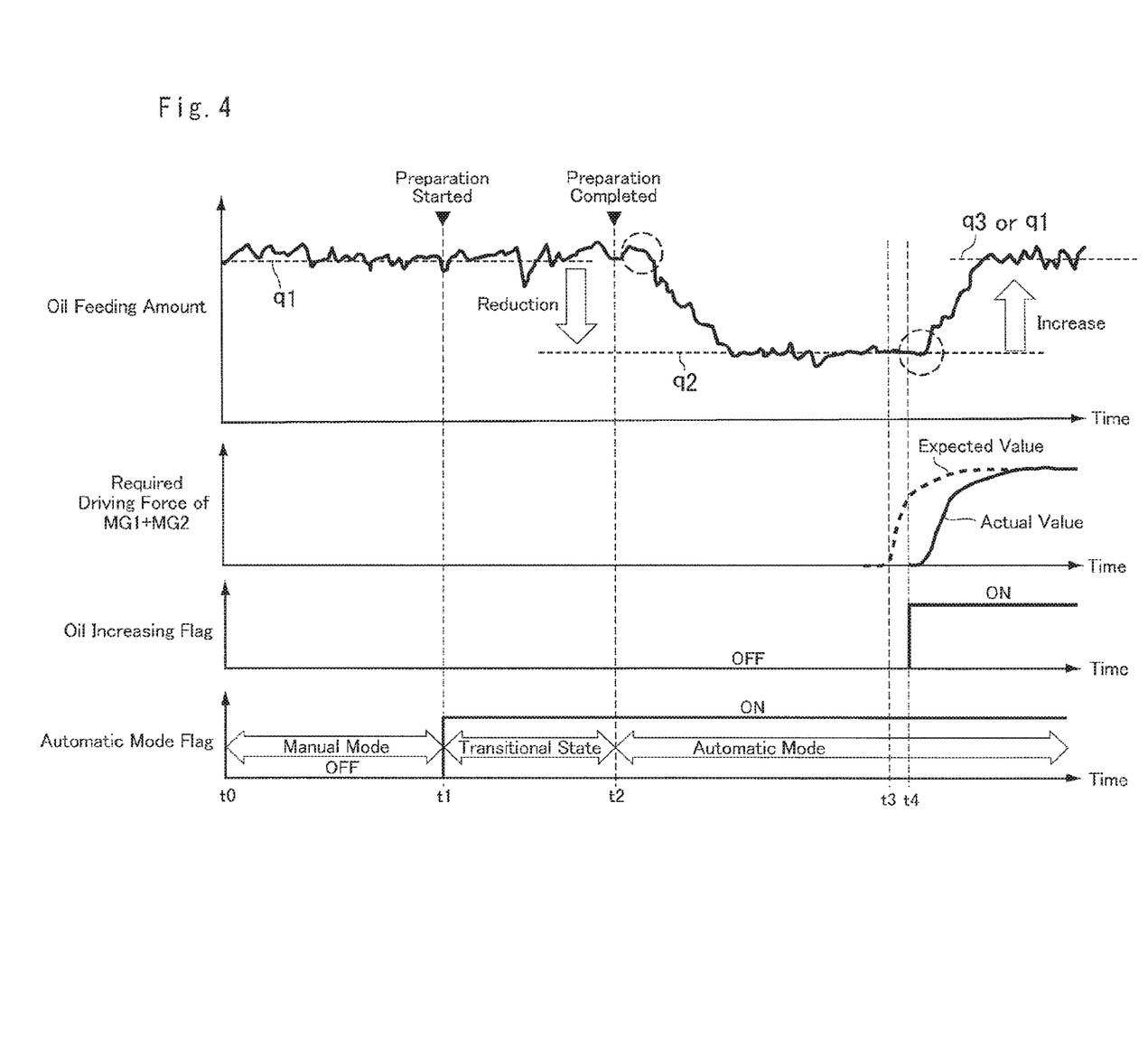
FIG. 4 is a time chart showing temporal changes in an oil supply and in a required driving force during execution of the control shown in FIG. 3 while shifting the operating mode from the manual mode to the autonomous mode.

Turning to FIG. 4, there is shown a temporal change in the oil feeding amount to the oil requiring site 6 during execution of the control shown in FIG. 3 while shifting the operating mode from the manual mode to the autonomous mode. In the example shown in FIG. 4, the vehicle Ve is operated manually by the driver under the manual mode in the initial phase from point t0 to point t1. In this situation, oil is delivered to the oil requiring site 6 from the oil feeding device 7 in the first feeding amount q1. When the demand to shift the operating mode to the autonomous mode is determined at point t1, the preparation for shifting the operating mode is started from point t1, and the autonomous mode is started from point t2.

After the operating mode is shifted to the autonomous mode at point t2, the oil feeding amount from the oil deeding device 7 to the oil requiring site 6 is reduced from the first feeding amount q1 to the second feeding amount q2. Thus, the oil feeding amount to the oil requiring site 6 is maintained to the first feeding amount q1 during the transitional state from the manual mode to the autonomous mode. In this case, therefore, oil can be delivered sufficiently to the oil requiring site 6 even if the requisite amount is increased by an operation of the driver during the transitional state.

In addition, during propulsion under the autonomous mode, the oil feeding amount to the oil requiring site 6 is reduced from the first feeding amount q1 to the second feeding amount q2 by reducing current supply to the pump motor 31 to reduce an output of the EOP 30. For this reason, the oil feeding amount to the oil requiring site 6 can be reduced to reduce an oil agitation loss. Further, an energy loss resulting from operating the pump motor 31 may also be reduced.

When the requisite amount of oil delivered to the oil requiring site 6 is expected to be increased based on the travel plan during propulsion under the autonomous mode, the oil feeding amount to the oil requiring site 6 is increased to deliver oil to the oil requiring site 6 in the requisite amount. In the example shown in FIG. 4, specifically, the vehicle Ve is powered only by the second motor 13 under the single-motor mode before point t3, and the running mode is expected to be shifted to the dual motor mode at point t3 to achieve a required large torque by both of the first motor 12 and the second motor 13. Therefore, shortly after point t3, a flag to increase an oil feeding amount to the oil requiring site 6 is turned on at point t4. Consequently, the oil feeding amount to the oil requiring site 6 is increased from the second feeding amount q2 to the first feeding amount q1 or to the third feeding amount q3.

Thus, the controller 8 is configured to predict an increase in the required amount of oil delivered to the oil requiring site 6 based on the travel plan during propulsion under the autonomous mode. For this reason, the oil feeding amount to the oil requiring site 6 can be adjusted arbitrarily during propulsion under the autonomous mode in accordance with an expected required oil feeding amount.

Figure 5:
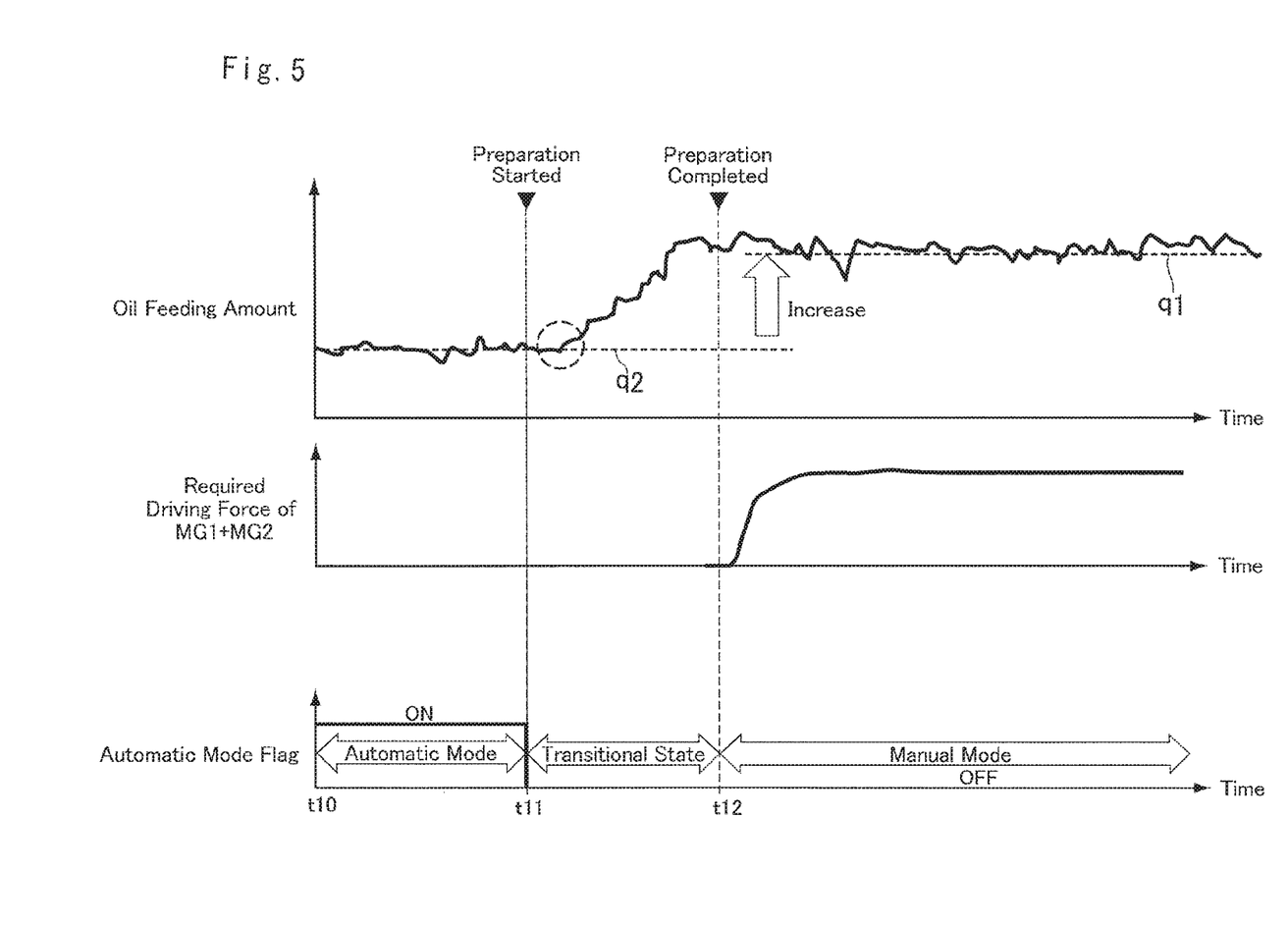
FIG. 5 is a time chart showing temporal changes in an oil supply and in a required driving force during execution of the control shown in FIG. 3 while shifting the operating mode from the autonomous mode to the manual mode.

Turning to FIG. 5, there is shown a temporal change in the oil feeding amount to the oil requiring site 6 during execution of the control shown in FIG. 3 while shifting the operating mode from the autonomous mode to the manual mode. In the example shown in FIG. 5, the vehicle Ve is operated autonomously under the autonomous mode in the initial phase from point t10 to point t11. In this situation, oil is delivered to the oil requiring site 6 from the oil feeding device 7 in the second feeding amount q2. When the demand to shift the operating mode to the manual mode is determined at point t11, the preparation for shifting the operating mode is started from point t11, and the manual mode is started from point t12.

In this case, the oil feeding amount from the oil deeding device 7 to the oil requiring site 6 is increased from the second feeding amount q2 to the first feeding amount q1 before the preparation for shifting to the manual mode is completed at point t12. That is, the oil feeding amount to the oil requiring site 6 has already been increased to the first feeding amount q1 when the manual mode is started. In this case, therefore, oil can be delivered sufficiently to the oil requiring site 6 even if the requisite amount is increased by an operation of the driver as soon as the establishment of the manual mode.

As thus far described, in the vehicle Ve shown in FIG. 2, the EOP 30 driven by the pump motor 31 is used to serve as the oil feeding device 7 for delivering oil to the oil requiring site 6. According to the present application, however, the MOP 41 shown in FIG. 6 and the MOP 51 shown in FIG. 7 may also be used as the oil feeding device 7 instead of the EOP 30.

As illustrated in FIG. 6, the MOP 41 is driven by the engine 11. Specifically, a rotor (not shown) of the MOP 41 is driven by a rotation of the output shaft 11a of the engine 11, and an electromagnetic valve 42 is disposed on an oil passage providing a connection between the MOP 41 and the oil requiring site 6. The electromagnetic valve 42 is activated in response to a control signal from the controller 8 in such a manner as to control a flow rate of oil flowing through the oil passage. In the embodiment shown in FIG. 6, therefore, oil can be delivered to the oil requiring site 6 by operating the engine 11 to drive the MOP 41, and the oil feeding amount to the oil requiring site 6 can be controlled by selectively activating the electromagnetic valve 42. Thus, in the vehicle Ve shown in FIG. 6, the oil feeding amount to the oil requiring site 6 may also be reduced during propulsion under the autonomous mode to reduce an oil agitation loss.

By contrast, the MOP 51 shown in FIG. 7 is driven by a torque from the driveshaft 15 side. Specifically a rotor (not shown) of the MOP 51 is driven together with the countershaft 24 connected to the driveshaft 15 through the differential gear unit 26 and the counter drive gear 28. In the embodiment shown in FIG. 7, an electromagnetic valve 52 is also disposed on an oil passage providing a connection between the MOP 41 and the oil requiring site 6. The electromagnetic valve 52 is also activated in response to a control signal from the controller 8 in such a manner as to control a flow rate of oil flowing through the oil passage. In the embodiment shown in FIG. 7, therefore, oil can be delivered from the MOP 41 to the oil requiring site 6 during propulsion of the vehicle Ve, and the oil feeding amount to the oil requiring site 6 can be controlled by selectively activating the electromagnetic valve 52. Thus, in the vehicle Ve shown in FIG. 7, the oil feeding amount to the oil requiring site 6 may also be reduced during propulsion under the autonomous mode to reduce an oil agitation loss.

In addition, the splash lubrication device 61 shown in FIG. 8 may also be used as the oil feeding device 7. In this case, as illustrated in FIG. 8, the oil feeding device 7 includes the splash lubrication device 61, oil reservoir 62 and 63, an oil passage 64, and an electromagnetic valve 65.

Specifically, in the splash lubrication device 61, teeth of the ring gear 27 of the differential gear unit 26 is immersed in the oil in an oil reservoir 62 so that the oil is splashed by the ring gear 27 rotated by a torque of the driveshaft 15 to be applied to the oil requiring site 6.

The oil reservoir 63 is situated underneath the oil requiring site 6 but above the oil reservoir 62. The oil reservoirs 62 and 63 are divided by a separator 66, but an oil passage 64 provides a connection therebetween. Specifically, one end of the oil passage 64 is situated in a lower side of the oil reservoir 63, and the other end of the oil passage 64 is situated in the oil reservoir 62 so that oil in the oil reservoir 63 is allowed to flow down to the oil reservoir 62 through the oil passage 64.

In addition, an electromagnetic valve 65 is disposed on the oil passage 64. The electromagnetic valve 65 is also activated in response to a control signal from the controller 8 in such a manner as to control a flow rate of oil flowing through the oil passage 64. In the embodiment shown in FIG. 8, therefore, oil can be delivered from splash lubrication device 61 to the oil requiring site 6 as long as oil in the oil reservoir 63 is available during propulsion of the vehicle Ve, and the oil feeding amount to the oil requiring site 6 can be controlled by selectively activating the electromagnetic valve 65. Thus, according to the example shown in FIG. 8, the oil feeding amount to the oil requiring site 6 may also be reduced during propulsion under the autonomous mode to reduce an oil agitation loss.

Although the above exemplary embodiments of the present application have been described, it will be understood by those skilled in the art that the present application should not be limited to the described exemplary embodiments, and various changes and modifications can be made within the spirit and scope of the present application. For example, the vehicle control system may also be applied to other kind of automobiles such as a single-motor hybrid vehicle in which an engine and one motor are used to form a prime mover, and a conventional vehicle in which only an engine is used as a prime mover.

What is claimed is:

1. A vehicle control system that is applied to a vehicle having an oil feeding device for delivering oil to an oil requiring site, and that is configured to select an operating mode of the vehicle from a manual mode in which the vehicle is operated manually by a driver and an autonomous mode in which the vehicle is operated autonomously in line with a travel plan including an expected required driving force, comprising a controller that is configured:

to create the travel plan;

to control a driving force and the oil feeding device in line with the travel plan;

to deliver oil from the oil feeding device to the oil requiring site in a first feeding amount during propulsion under the manual mode, and to deliver oil from the oil feeding device to the oil requiring site in a second feeding amount that is smaller than the first feeding amount during propulsion under the autonomous mode; and     to increase an oil feeding amount to the oil requiring site from the second feeding amount when a required amount of oil delivered to the oil requiring site is expected to be increased based on the travel plan during propulsion under the autonomous mode.

2. The vehicle control system as claimed in claim 1, wherein the controller is further configured:

to reduce the oil feeding amount to the oil requiring site to the second feeding amount after a completion of shifting of the operating mode from the manual mode to the autonomous mode; and to increase the oil feeding amount to the oil requiring site to the first feeding amount before a completion of shifting of the operating mode from the autonomous mode to the manual mode.

\* \* \* \* \*